United States Patent
Bellah

(10) Patent No.: US 11,953,291 B2
(45) Date of Patent: Apr. 9, 2024

(54) MULTI-USE LASER RANGEFINDER

(71) Applicant: Lightforce USA, Inc., Orofino, ID (US)

(72) Inventor: Brian J. Bellah, Orofino, ID (US)

(73) Assignee: Lightforce USA, Inc., Orofino, ID (US)

( * ) Notice: Subject to any disclaimer, the term of this patent is extended or adjusted under 35 U.S.C. 154(b) by 327 days.

(21) Appl. No.: 17/411,126

(22) Filed: Aug. 25, 2021

(65) Prior Publication Data
US 2022/0074709 A1   Mar. 10, 2022

Related U.S. Application Data

(60) Provisional application No. 63/075,880, filed on Sep. 9, 2020.

(51) Int. Cl.
| | |
|---|---|
| *F41G 3/06* | (2006.01) |
| *F41G 3/26* | (2006.01) |
| *G01C 3/08* | (2006.01) |

(52) U.S. Cl.
CPC ............. *F41G 3/06* (2013.01); *F41G 3/2616* (2013.01); *G01C 3/08* (2013.01)

(58) Field of Classification Search
CPC .. F41G 1/00; F41G 1/473; F41G 11/00; F41G 3/06; F41G 3/2616; G01C 3/08
See application file for complete search history.

(56) References Cited

U.S. PATENT DOCUMENTS

| | | | | |
|---|---|---|---|---|
| 5,831,718 | A | * | 11/1998 | Desai ....................... G01C 3/08 89/41.06 |
| 8,047,118 | B1 | | 11/2011 | Teetzel et al. |
| 2005/0205621 | A1 | * | 9/2005 | Shults ................... F41G 11/003 224/198 |
| 2019/0219812 | A1 | * | 7/2019 | Havens .................. G02B 23/10 |
| 2020/0264283 | A1 | * | 8/2020 | Fu .......................... G01S 7/4876 |

FOREIGN PATENT DOCUMENTS

GB   2024558 A   1/1980

OTHER PUBLICATIONS

European Patent Office, Extended European Search Report issued in corresponding EP Application No. 21195281.7, dated Jan. 25, 2022, 5 pages.

* cited by examiner

*Primary Examiner* — Hina F Ayub
(74) *Attorney, Agent, or Firm* — Wood Herron & Evans LLP

(57) ABSTRACT

Provided is a multi-use laser rangefinder usable in either of hand-held and weapon-mounted modes. It includes a compact laser rangefinder (LRF) removably mountable to a weapon system and an optical aiming unit separate from a weapon system optical sighting device. The compact optical aiming unit has a point of aim viewable therethrough and is removably attachable to the rangefinder. The LRF has a point of aim adjustable to a point of aim of the weapon system when mounted and to the point of aim of the optical aiming unit when LRF is demounted and the optical aiming unit is attached to the LRF.

3 Claims, 2 Drawing Sheets

MULTI-USE LASER RANGEFINDER

RELATED APPLICATION

This application claims priority to U.S. Provisional Patent Application No. 63/075,880, filed Sep. 9, 2020, and incorporates the same herein by reference.

TECHNICAL FIELD

This invention relates to a laser rangefinder (LRF) that can be used interchangeably as a compact hand-held, look-through device or as a weapon-mounted device.

BACKGROUND

Hand-held LRFs use "look-through" aiming, which includes an integrated optical aiming system that allows the user to look through a lens and aim the nonvisible laser beam of the LRF at a selected target with an aimpoint indicated by a simple (or complex) reticle. The integrated optical aiming system may or may not magnify image of the target seen in the field of view. Conventional weapon-mounted designated LRF units are often very compact, do not include an integrated optical aiming system, and require some type of alignment system (typically, a visible wavelength laser coaligned with the nonvisible distance measuring laser) in order to co-align the nonvisible ranging laser beam with the weapon scope reticle. Once co-aligned with the scope, the user aims the LRF with the scope. The features which make the weapon-mounted LRF desirable, render it inoperable as a conventional look-through, hand-held LRF without the optical aiming ability of the coaligned riflescope.

SUMMARY OF THE INVENTION

Provided is a multi-use laser rangefinder (LRF) comprising the combination of a laser rangefinder usable in either hand-held or weapon-mounted modes and an optical aiming unit having a point of aim viewable therethrough and removably attachable to the rangefinder. The rangefinder has a point of aim adjustable to a point of aim of the weapon when mounted to the weapon system adjustable to the point of aim of the optical aiming unit when dismounted from the weapons system and the optical aiming unit is attached to the rangefinder.

A removably attachable monocular or telescope unit, with an imbedded aiming reticle, can be used as a visual aiming system (VAS) for a weapon-mounted LRF when the LRF dismounted from the weapon system. This allows the weapon-mounted LRF unit to be removed from a weapon, the optical aiming unit to be attached, and then used in the field as a hand-held, look-through-aiming device.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

Like reference numerals are used to indicate like parts throughout the various drawing figures, wherein.

DETAILED DESCRIPTION

Figure 2:
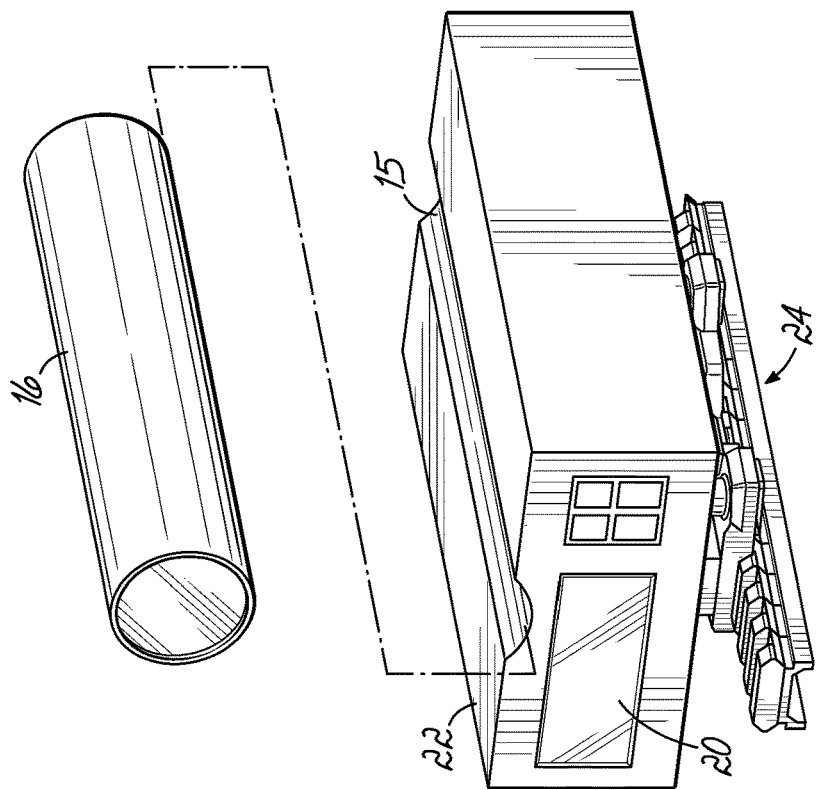
FIG. 2 is an exploded rear pictorial view thereof.

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments. "Forward" will indicate the direction of the muzzle and the direction in which projectiles are fired, while "rearward" will indicate the opposite direction. "Lateral" or "transverse" indicates a side-to-side direction generally perpendicular to the axis of the barrel. Although firearms may be used in any orientation, "left" and "right" will generally indicate the sides according to the user's orientation, "top" or "up" will be the upward direction when the firearm is gripped in the ordinary manner.

Figure 1:
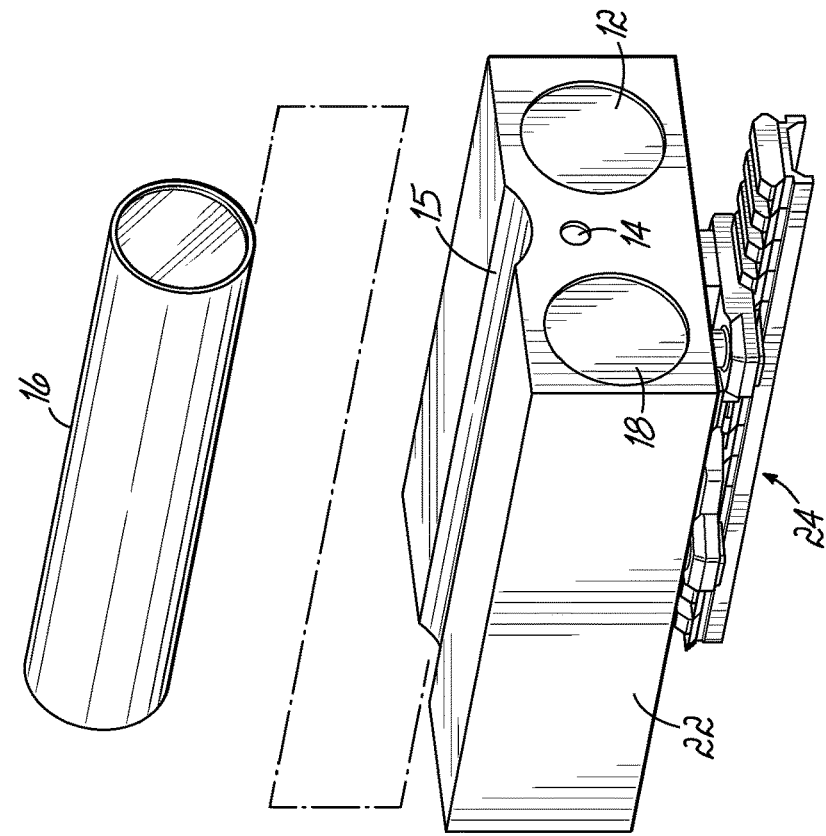
FIG. 1 is an exploded front pictorial view of a laser rangefinder (LRF) according to one embodiment of the present invention shown with an optical viewfinder separated from a weapon-mounted unit.
Figure 4:
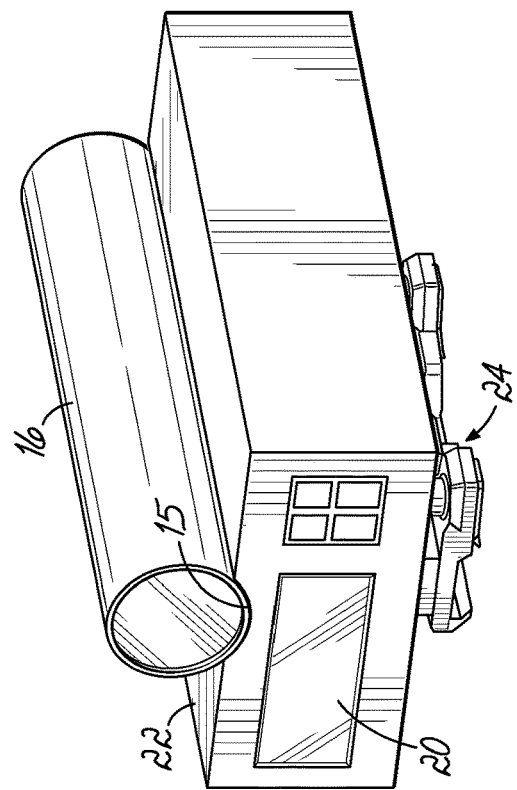
FIG. 4 is a rear pictorial view thereof.
Figure 3:
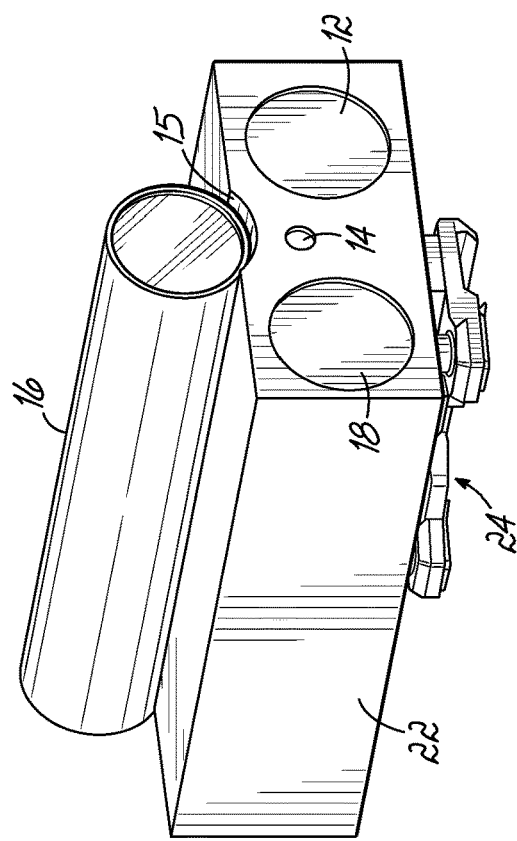
FIG. 3 is a front pictorial view thereof with the optical viewfinder attached to the unit, which is dismounted from a weapon.

Referring to FIGS. 1-4, an embodiment of a laser rangefinder (LRF) 10 may include at least two illumination sources, one being a near infrared laser (NIR) source projected from send optic aperture (SX) 12 to perform distance measurement and the other a visible light laser source (VIS) projected from alignment optic aperture (AX) 14 to provide alignment of the NIR laser with a reticle imbedded within an optic 16 (such as a VAS monocular or weapon aiming optic). In other embodiments, the VIS and NIR lasers may share the same send aperture. A receiver system is required for distance measurements, traditionally using some form of photodiode and a receiver optic (RX) aperture 18. An external display 20 of some type communicates the distance measurement to the operator. A mechanical housing 22 contains all above electro-optical systems, which also allows for some form of mechanical mounting solution 24 for weapon-mounted usage. A mechanical apparatus (not shown) provides a mechanical positioning/alignment adjustment solution, using the VIS-AX system to accurately steer the NIR-SX system for coalignment and projectile weapon usage. The LRF 10 includes an on-board and/or external electrical power supply (not shown).

In this invention, an optical aiming unit in the form of a small, non-inverting, detachable telescope/monocular 16 with an imbedded reticle, separate from the weapons system riflescope (not shown), is used to aim and align the VIS-AX and NIR-SX systems, such that the entire device 10 can be unmounted from the weapon (not shown) and then used as a compact handheld LRF and/or target identifier/illumination device. The LRF 10 and optical aiming unit 16 include a cooperative integrated mounting solution 15 to provide the installation/removal of the small telescope/monocular 16 with a high degree of bore-sight repeatability. The mount can allow the parts 10, 16 to snap or slide together securely, but releasably, according to any suitable known means that provides reliably repeatable positioning.

So that the adjusted aimpoint of the LRF 10 remains zeroed to the weapon riflescope through detachment and reattachment, the aiming reticle of the optical aiming unit 16 may be adjustable to coalignment (zeroed) with the aimpoint of the LRF 10.

This invention allows one LRF system 10 to be used in two different applications—weapon mounted and handheld. Potentially, it allows for a much more compact handheld device. Additionally, it allows the VIS-AX system to be used as a secondary target designator. This gives the operator a choice of using the telescope or just aiming with a "laser pointer." Likewise, the operator can also use the monocular/telescope 16, removed from the LRF system housing 22, as a compact magnifying optic.

While one or more embodiments of the present invention have been described in detail, it should be apparent that modifications and variations thereto are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention, defined by the issued claim or claims.

What is claimed is:

1. A multi-use laser rangefinder usable in either of handheld and weapon-mounted modes, comprising:
    a laser rangefinder (LRF) removably mountable to a weapon system that has a separate optical sighting device; and
    an optical aiming unit, separate from the weapon system optical sighting device, the optical aiming unit having a point of aim viewable therethrough and removably attachable to the LRF when the LRF is not mounted to the weapon system;
    the LRF having a point of aim adjustable to a point of aim of the weapon system optical sighting device when the LRF is mounted to the weapon system and adjustable to the point of aim of the optical aiming unit when the LRF is demounted from the weapon system and the optical aiming unit is attached to the LRF.

2. The multi-use laser rangefinder of claim 1, wherein the LRF includes both visible and nonvisible laser sources.

3. The multi-use laser rangefinder of claim 1, wherein the optical aiming unit aimpoint is adjustable to co-align with the aimpoint of the LRF point of aim.

* * * * *